United States Patent

Breuker et al.

[11] Patent Number: 5,181,987
[45] Date of Patent: Jan. 26, 1993

[54] DEVICE AND PROCESS FOR PRECIPITATING POLYMERS

[75] Inventors: Walter Breuker, Haltern; Hans Wagner; Eckhard Möller, both of Marl; Bernhard Schleimer, Paderborn, all of Fed. Rep. of Germany

[73] Assignee: Bunkawerke Huls GmbH, Marl, Fed. Rep. of Germany

[21] Appl. No.: 696,915

[22] Filed: May 8, 1991

[30] Foreign Application Priority Data

Jun. 13, 1990 [DE] Fed. Rep. of Germany ....... 4018912

[51] Int. Cl.⁵ .............................................. B01D 3/00
[52] U.S. Cl. .................... 159/4.08; 159/16.3; 210/177; 210/180; 210/205; 210/702; 210/738; 366/167; 366/173; 422/256; 422/257; 523/315; 528/500
[58] Field of Search ............... 422/135, 224, 256, 257; 523/315, 318, 324, 326, 335; 210/805, 199, 205, 738, 702, 177, 180; 528/500; 366/150, 167, 173, 177, 182; 159/16.3, 4.08

[56] References Cited

U.S. PATENT DOCUMENTS

| | | | |
|---|---|---|---|
| 2,647,103 | 7/1953 | Griffith et al. | 528/487 |
| 3,306,342 | 2/1967 | Di Salvo et al. | 366/167 |
| 3,553,186 | 1/1971 | Schnoring et al. | 528/500 |
| 3,653,638 | 4/1972 | Showalter | 366/167 |
| 3,667,131 | 6/1972 | Stephanoff | 34/10 |
| 3,915,438 | 10/1975 | Neiley, Jr. et al. | 422/224 |
| 3,936,036 | 2/1976 | Fries | 366/173 |
| 4,179,642 | 4/1965 | Pflegerl et al. | 528/499 |
| 4,206,161 | 6/1980 | Sato et al. | 264/11 |
| 4,647,212 | 3/1987 | Hankison | 366/167 |

FOREIGN PATENT DOCUMENTS 1274082 8/1968 Fed. Rep. of Germany .

Primary Examiner—Stanley S. Silverman
Assistant Examiner—Neil M. McCarthy
Attorney, Agent, or Firm—Longacre & White

[57] ABSTRACT

A device for precipitating polymers from a liquid by at least one precipitant fluid includes a feed line, a nozzle plate having at least one outlet orifice for a polymer containing fluid with the outlet orifice communicating with the feed line, at least one nozzle for at least one precipitant fluid, the axis of which is arranged approximately perpendicularly to the axis of the outlet orifice, a precipitation chamber positioned on the side of the nozzle plate wherein at least one nozzle for at least one precipitant fluid is located, a discharge line for discharging a mixture which contains the precipitated polymer and a degassing chamber which is connected to the discharge line.

19 Claims, 2 Drawing Sheets

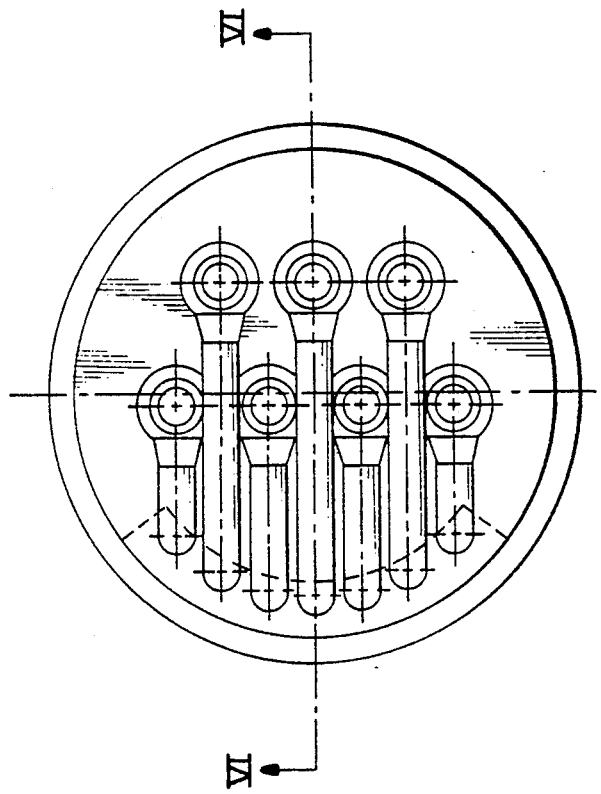
FIG. 4
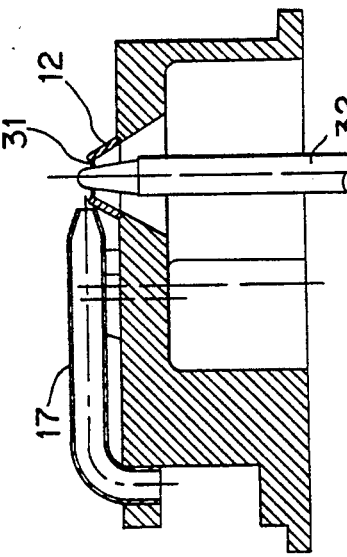
FIG. 6
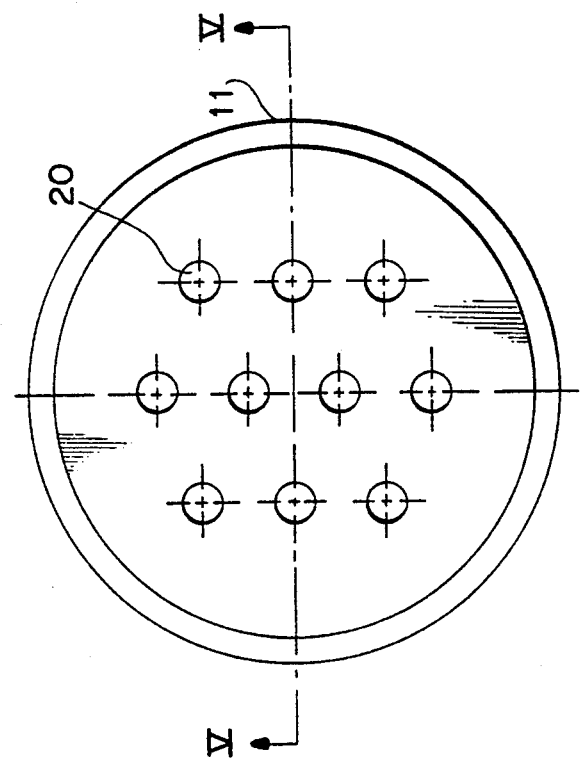
FIG. 3
FIG. 5

DEVICE AND PROCESS FOR PRECIPITATING POLYMERS

BACKGROUND OF THE INVENTION

1. Field of the Invention

This invention concerns a device and a process for precipitating polymers from polymer-containing fluids (solutions, emulsions or suspensions) by means of at least one fluid. The purpose of the invention is to simplify the precipitation step, thereby making this device and process more commercially viable than the devices and processes currently available.

2. Description of the Prior Art

It is known to coagulate the latex in polymeric latex emulsions by means of acids and to thus recover the polymer. An acid-containing fluid is formed as a by-product, which must either be reprocessed or disposed of- sometimes at considerable cost.

Dissolved, suspended or emulsified plastics can be recovered by evaporation of the solvent. However, this process requires a considerable energy input, particularly in those cases where the solvents have a very low concentration of plastic.

A process for the continuous recovery of polymers from an emulsion is described in EP-0,030,994. The latex is fed by means of a steam-charged nozzle laterally through a plurality of channels, the latex being divided into a particle dispersion. This dispersion is passed through a steam-heated heat exchanger of the tube-in-tube type. The dispersion consists of the polymer in the form of solid particles together with liquid particles in a steam phase which contain the unconverted monomers and the steam. The steam phase is then separated off. In place of the heat exchanger, a washing stage can be used. The process is applied to non-tacky polymers; in the case of tacky polymers, blockages at the nozzles, heat exchanger and cyclone are to be expected. The lattices are aqueous emulsions of polymers; these do not contain any solvent which must be expelled by evaporation. The residence time of the dispersion of precipitated polymer in water is 0.1-1 second in the exchanger.

In German Patent Document No. 2,365,073, a device for precipitating plastics out of the solvent using heated water is described. A fluid containing the plastic and heated water are introduced under pressure into the device. The jets of this fluid, emerging through nozzles, pass directly into an atomization chamber, which contains evaporated solvent, evaporated water, and the precipitated plastic. The plastic drops downward together with water which has not evaporated and is separated from the gas phase. Because of the spontaneous transfer of the precipitated plastic and the heated water into the gas space, the liquid phase and the gas phase separate quickly from one another. Liquid residues and monomers contained in the precipitated plastic remain occluded in the plastic particles. The device, especially the nozzle for the fluid containing the plastic, can be cleaned only after the device has first been dismantled. A downward-tapering bracket fitted to the adjuster protrudes into the atomization chamber.

SUMMARY OF THE INVENTION

In the present invention tacky and non-tacky polymers can be completely precipitated from the polymer-containing fluid and freed as completely as possible of solvent and of monomers. The invention precipitates polymers from a liquid by means of at least one precipitant fluid and is comprised of a feed line for at least one precipitant fluid, a nozzle plate having at least one outlet orifice for a polymer containing fluid with the outlet orifice communicating with the feed line and at least one nozzle for at least one precipitant fluid, the axis of the nozzle being arranged approximately perpendicularly to the axis of the outlet orifice. The device also has a precipitation chamber positioned on the side of the nozzle plate, wherein at least one nozzle for at least one precipitant fluid is also located, a discharge line for discharging a mixture which contains the precipitated polymer, and a degassing chamber which is connected to the discharge line.

The outlet orifices and the feed lines for the precipitant fluid or fluids lead into the precipitation chamber, from which a mixture is taken off which contains the precipitated polymer. The precipitation chamber is adjoined by a degassing chamber whose axis runs essentially vertically.

The precipitation chamber is located entirely above the nozzle plate. The surface of the nozzle plate forms an angle of 10-60 degrees with the axis of the discharge line for the fluid containing the precipitated polymer.

The degassing chamber, into which the mixture with the precipitated polymer enters, preferably has the shape of a pipe. The pipe either has a constant cross-section or widens towards its end to a cross-section which is up to 25 times the cross-section of the pipe at the origin (at the junction with the precipitation chamber). The length of the pipe is 30-60 times the diameter at the pipe origin. The pipe is in an essentially vertical arrangement and is connected to the precipitation chamber without significant deviation from the vertical.

Preferably, each outlet orifice for the fluid containing the polymer which is to be precipitated is associated with a nozzle for the precipitant fluid. The width of the nozzle orifices is at least that of the outlet orifices. These nozzle orifices for the precipitant fluid preferably have a slot-like cross-section whose center plane lies in or slightly above the plane of the outlet orifices. The feed line for the precipitant fluid has its narrowest point directly at the nozzle-shaped end so that almost the entire pressure gradient can be utilized for generating a high jet velocity.

The outlet orifices for the fluid containing the polymer which is to be precipitated can be cylindrical bores in the nozzle plate. They can also be conical and end above the surface of the nozzle plate.

In each outlet orifice, a cylindrical insert can be fitted whose circumferential surface forms an angular gap of constant width with the edge of the outlet orifice. The end of this insert lies in or approximately in the plane of the outlet orifices and protrudes at most only insignificantly from the plane. The insert can also be frusto-conical and displaceable in the direction of its axis and can form an annular gap of variable width with the edge of the outlet orifice.

The insert can consist of a frusto-conical part and an adjoining cylindrical part of a diameter preferably exactly the same as that of the outlet orifice, the base of the frustrum having, if appropriate, a diameter slightly smaller than that of the cylindrical part. Preferably, such an insert is displaceable in its axial direction until its cylindrical part penetrates the outlet orifice.

The process for precipitating fluids from a liquid comprises combining a jet of the polymer-containing fluid and a jet of the precipitation fluid. The jets strike each other at an approximate right angle in a precipitation chamber which is almost completely filled with precipitant fluid. The precipitated polymer is almost completely degassed in the degassing chamber and passes into a vessel where the gas phase separates from the liquid phase. A fluid with precipitated polymer is taken off from the vessel. The vessel can contain a stirrer to circulate one of the precipitant fluids, with the fluid circulating through a separation vessel.

For precipitating synthetic rubber from a polymer containing fluid which consists essentially of hexane, hot pressurized water or steam is used as the precipitant fluid. The jet of the polymer-containing fluid is preferably a hollow, thin-walled jet from an annular outlet orifice. The major part of the heat required for the precipitation is passed into the precipitation chamber by means of one of the precipitant fluids. At least one of the precipitant fluids perpendicularly strikes at a very high velocity the jet of the fluid containing the polymer which is to be precipitated.

Preferably, three streams of material are introduced into the precipitation chamber. These streams are the fluid containing the polymer which is to be precipitated, and the two fluids used for the precipitation, one of which is preferably circulated.

The fluid containing the precipitated polymers should reside in the degassing chamber 10-100 seconds. If the precipitated polymer cannot be degassed to a sufficient extent in on degassing stage, the suspension with the precipitated polymer is passed through further degassing stages.

The fluids containing the polymer which is to be precipitated can be fluids which consist essentially of water or of an organic fluid such as hexane, benzene, toluene, trivinylcyclohexane, methylene chloride, propene or styrene. The polymer can, for example, be a thermoplastic, synthetic rubber or natural rubber.

This invention has numerous advantages over the prior art. The precipitation step takes place primarily during the liquid phase and the precipitated polymer is discharged with the liquid phase.

As the particles of the precipitated polymer also always remain in contact with a fluid, agglomerations are prevented. This invention is also applicable for polymer-containing fluids, from which a very tacky polymer is precipitated.

Additionally, the particle size distribution of the crumbs is narrower than in other precipitation processes. With this invention, the particles now have a structure penetrated by capillaries and are less compact than the particles precipitated by other processes. There are numerous advantages to the degassing chamber in this invention. In the degassing chamber, the precipitated particles are held at an elevated temperature. The residual content of degassable substances is reduced and is markedly more uniform than in other precipitation processes. Owing to the uniform particle size, less energy for degassing is required than was necessary for the prior art.

There are also advantages to the invention's outlet orifices. The polymer-containing fluid is held up to the outlet orifice at a defined pressure which can be influences by the free cross-section of the outlet orifice provided with an insert. The outlet orifices can be cleaned by introducing the ram-like inserts without dismantling the device and with practically no interruption to the operation of the precipitation process.

Furthermore, one (stirred) vessel can supply several precipitation devices with circulating fluid and receive fluid with the precipitated polymer with several precipitation devices. No chemical substances foreign to the process are required for the precipitation. In fact, when steam is used as the precipitation fluid, virtually, no waste fluid and no acid-containing effluent arise.

BRIEF DESCRIPTION OF THE DRAWINGS

FIG. 3 is a cross-section and a side view of the nozzle plate.

FIG. 4 is a cross-section and a side view of another embodiment of the nozzle plate.

DESCRIPTION OF THE PREFERRED EMBODIMENTS

Figure 1:
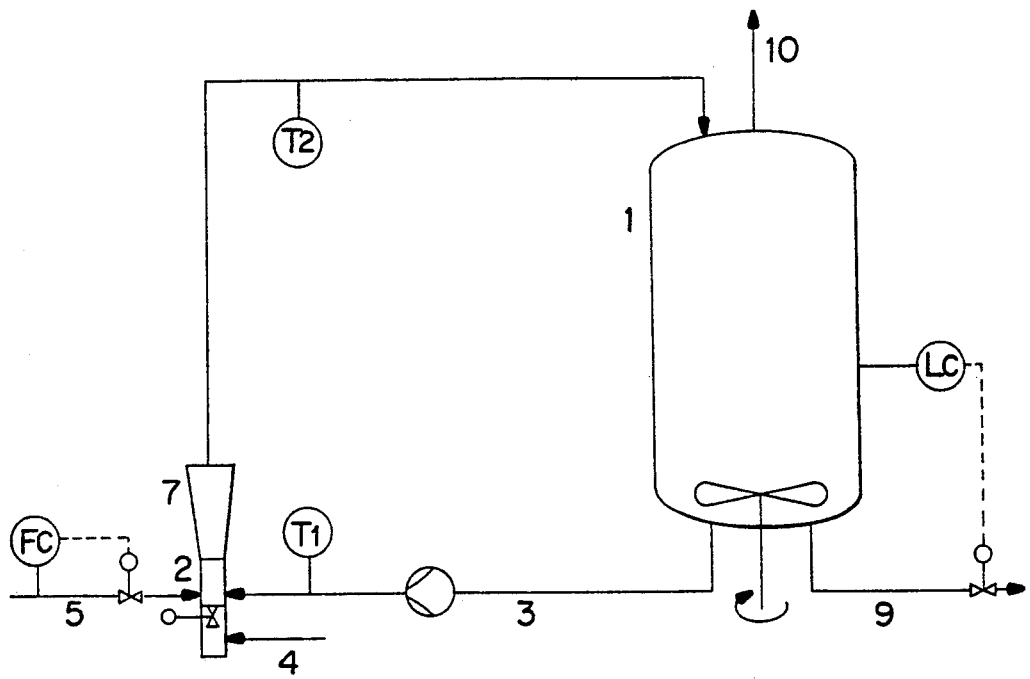
FIG. 1 is a schematic representation of precipitation device according to the invention.

This invention for precipitating polymers contained in fluid using two precipitant fluids, one of which is being recirculated, is comprised of a vessel 1, preferably with a stirrer 33, a precipitation device 2, a degassing chamber 7, a pump 34 for the recirculated precipitant fluid 13, pipes with isolation devices and flow 35, temperature 36 and 37 and level instruments 38.

The precipitation device, 2 is supplied via the feed line 3 with one precipitant fluid 13 from the vessel 1, with the fluid 14 containing the polymer which is to be precipitated via feed line 4 and with the second fluid 15 used for precipitation via feed line 5. The mixture with the precipitated polymer leaves the precipitation device 2 via the discharge line 6, runs through the degassing chamber 7 and is passed into the vapor space of the vessel 1 via transport line 39. A dispersion of the precipitated polymer is taken off from the vessel 1 via the discharge line 9. The gas arising on degassing leaves the vessel 1 via the discharge line 10 and is then processed.

Figure 2:
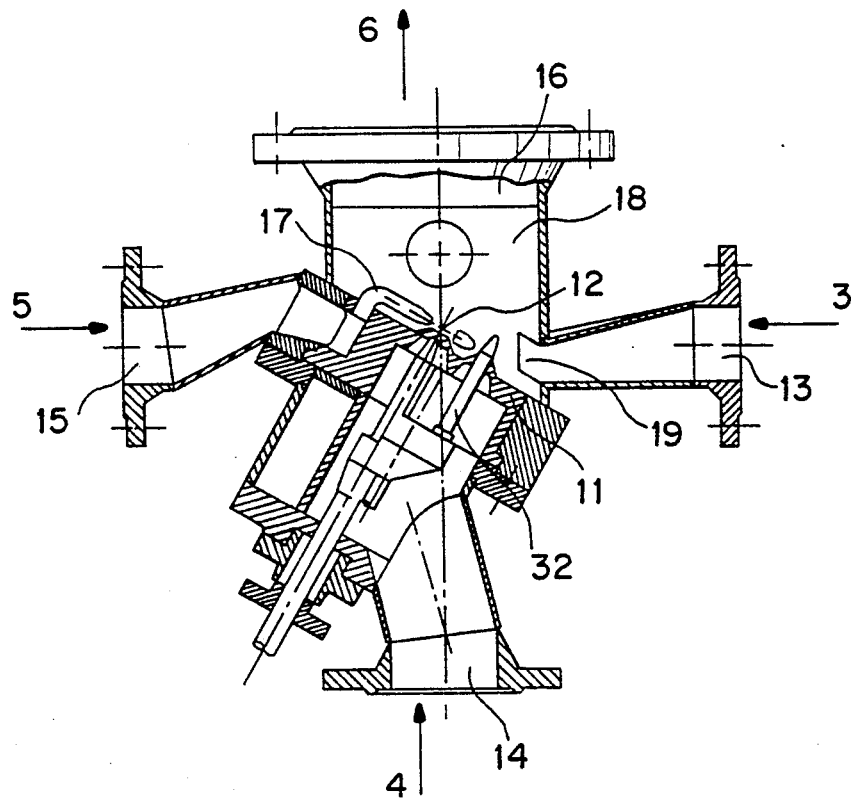
FIG. 2 is a cross-section of the precipitation device.

An example of a precipitation device for two precipitant fluids is shown in FIG. 2. The nozzle plate 11 contains: outlet orifices 12 for the polymer-containing fluid 14 via feed line 4, nozzles 17 for one precipitant fluid 15 via feed line 5, nozzles 19 for the other precipitant fluid 13 via feed line 3. The three streams of material mix in the precipitation chamber 18. The mixture containing the precipitated polymer 16 leaves the precipitation chamber via the discharge line 6. The outlet orifices 12 are provided with ram-like, axially displaceable inserts 32 which are shown in different positions.

A plurality of cylindrical bores 20 in the nozzle plate 11 are shown in cross-section and in side view from the outlet side in FIG. 3. Similarly, another embodiment of the outlet orifices 12 with insert 32 and an annular gap 31, along with the arrangement of the nozzles 17 for one precipitant fluid are shown in cross-section and in side view from the outlet side.

The examples given below further explain the process carried out by means of the invention.

EXAMPLE 1

For the comparative test, a device is used which consists essentially of the following items of the apparatus: the stirred vessel 1, a pump 34 for the precipitant fluid, the precipitation chamber 18, a degassing pipe 7, and the transport line 33 to the vapor space of the stirred vessel 1.

The precipitation space is bounded on the underside by a perforated plate which has four cylindrical bores of 25 mm diameter. The precipitant fluid is introduced through a simple pipe parallel to the surface of this plate. Steam is introduced through a simple pipe opposite to the end of the pipe carrying the precipitant fluid. The fluid containing the precipitated polymer passes from the precipitation chamber into the vertically arranged degassing pipe.

For the test of the device and process of the invention, the precipitation chamber with a perforated plate is replaced by the device according to the invention. The invention has seven outlet orifices of 16 mm diameter, each having an insert. Each outlet orifice is associated with a nozzle for the second precipitant fluid, and each nozzle consists of a pipe 16 mm in diameter which merges at the end into a slot of 25 mm width. The line arrangement is the same as in the comparative test.

The test results of the invention and the test apparatus are given below.

TABLE 1

|  | Comparative Device | Device and Process According to the Invention |
| --- | --- | --- |
| Temperature in the stirred vessel | 85 | 85° C. |
| Pressure in the stirred vessel | 300 | 300 mbar |
| Throughput of the circulated first precipitant fluid | 150 | 150 m³/hour |
| Throughput of the polymer solution in hexane | 10 | 10 tonnes/hour |
| Solids content of the polymer solution | 10.0 | 10.0% |
| Throughput of the second precipitant fluid (steam) | 0.5 | 0.5 tonne/hour |
| Temperature T1 of the circulated precipitant fluid before entry to the precipitation chamber | 85 | 85° C. |
| Temperature T2 of the mixture after it has left the degassing pipe | 78 | 78° C. |
| Mean crumb diameter | 20 | 10 mm |
| Range of the crumb diameter | 5-25 | 4-12 mm |
| Solvent content of the crumbs | — | 60% of the content in the comparative test |

As indicated by the results in Table 1, the mean crumb diameter and the range of the crumb diameter are only half those in the comparative test. The solvent content of the polymer precipitated by the process according to the invention is only 60% of the solvent content of the crumbs from the comparative test.

EXAMPLE 2

In this comparative test, a control device similar to the test apparatus in Example 1 is used. However, in this instance, the precipitation chamber is bounded on the underside by a perforated plate which has only one cylindrical bore of 30 mm diameter. Parallel to the surface of this plate, the precipitant fluid is introduced through a simple pipe. In this example part of the precipitant fluid comes from the vessel 1 and part comes from the suspension drawn off via the line 9, after the crumbs have been largely separated therefrom. The part of the fluid drawn off via the line has a somewhat higher temperature than the temperature of the fluid taken from the vessel. Additionally, no steam is passed into the precipitation chamber. The fluid containing the precipitated polymer passes from the precipitation chamber into the vertically arranged degassing pipe.

For the process and device according to the invention, the precipitation chamber with a perforated plate is replaced by the device according to the invention as indicated in Example 1.

The results for Example 2 are as follows.

TABLE 2

|  | Comparative Device | Device and Process According to the Invention |
| --- | --- | --- |
| Temperature in the stirred vessel | 85 | 85° C. |
| Pressure in the stirred vessel | 35 | 35 mbar |
| Throughput of the circulated first precipitant fluid | 60 | 60 m³/hour |
| Throughput of the polymer solution in benzene | 8 | 8 tonnes/hour |
| Solids content of the polymer solution | 12.5 | 12.5% |
| Throughput of the second precipitant fluid (steam) | 0 | 0.8 tonne/hour |
| Temperature Ti of the circulated precipitant fluid before entry to the precipitation chamber | 91 | 91° C. |
| Temperature T2 of the mixture after it has left the degassing pipe | 77 | 84° C. |
| Mean crumb diameter | 7 | 4 mm |
| Range of the crumb diameter | 4-10 | 3-5 mm |
| Solvent content of the crumbs | — | 60% of the content in the comparative test |

As indicated above in Table 2, the mean crumb diameter resulting from the device and process of the invention is only half that as that resulting from the comparative device. Additionally, the range of the crumb diameter is only about one third of the range of the comparative device. The solvent content of the precipitated polymer from the invention is only 60% of the solvent content of the crumbs from the comparative device.

EXAMPLE 3

In another comparative test, a device analogous to the comparative device in Example 1 is used, except that the fluid containing the precipitated polymer is recycled into the fluid filled space of the stirred vessel 1. The precipitation chamber is the same as the precipitation chamber used for the comparative test in Example 2.

For the device and process according to the invention, the precipitation chamber with a perforated plate is replaced by the device according to the invention indicated in Example 1.

The results of this experiment are shown below in Table 3.

TABLE 3

|  | Comparative Device | Device and Process According to the Invention |
| --- | --- | --- |
| Temperature in the stirred vessel | 93 | 85° C. |
| Pressure in the stirred vessel | 50 | 50 mbar |
| Throughput of the circulated first precipitant fluid | 60 | 60 m³/hour |
| Throughput of the polymer solution in benzene | 18 | 21 tonnes/hour |
| Solids content of the polymer solution | 14 | 14% |

TABLE 3-continued

| | Comparative Device | Device and Process According to the Invention |
|---|---|---|
| Throughput of the second precipitant fluid (steam) | 0 | 1.5 tonne/hour |
| Temperature T1 of the circulated precipitant fluid before entry to the precipitation chamber | 93 | 85° C. |
| Temperature T2 of the mixture after it has left the degassing pipe | 73 | 72° C. |
| Mean crumb diameter | 25 | 10 mm |
| Range of the crumb diameter | 10-35 | 5-15 mm |
| Solvent content of the crumbs | — | 40% of the content in the comparative test |

As indicated in table 3, the mean crumb diameter of the invention and process is less than half of that of the comparative device. The range of the crumb diameter is only about half the range of the comparative device and the solvent content of the precipitated polymer is only 40% of the solvent content of the crumbs from the comparative device.

Although particular embodiments of the present invention have been described and illustrated herein, it should be recognized that modifications and variations may readily occur to those skilled in the art and that such modifications and variations may be made without departing from the spirit and scope of the invention. Consequently, the invention as claimed below may be practiced otherwise than as specifically described above.

What is claimed is:

1. A device for precipitating polymers from a liquid by means of at least one precipitant fluid, comprising:
   a nozzle plate having at least one outlet orifice for the polymer containing fluid, said outlet orifice communicating with a first feed line;
   at least one nozzle for at least one precipitant fluid, said nozzle communicating with a second feed line, the axis of said nozzle being arranged approximately perpendicularly to the axis of said outlet orifice;
   a precipitation chamber positioned on the side of said nozzle plate, wherein at least one said nozzle for at least one precipitant fluid is also located;
   a discharge line for discharging a mixture which contains the precipitated polymer; and
   a degassing chamber which is connected to said discharge line.

2. A device for precipitating polymers from a liquid according to claim 1, wherein the nozzles communicate with the feed line.

3. A device for precipitating polymers from a liquid according to claim 1, further comprising a recirculation means for recirculating said precipitant fluid through said device, said recirculation means comprising:
   a container means for receiving said precipitant fluid;
   a first transport line for transporting said precipitant fluid from said degassing chamber to said container means;
   a second transport line for recirculating said precipitant fluid from said container means to said device; and
   a pump for pumping said precipitant fluid through said recirculation means.

4. A device for precipitating polymers from a liquid according to claim 1, wherein the axis of the precipitation chamber runs essentially parallel to the direction of the earth's gravity.

5. A device for precipitating polymers from a liquid according to claim 1, wherein the surface of the nozzle plate forms an angle of 10-60 degrees with the axis of the discharge line for the fluid containing the precipitated polymer.

6. A device for precipitating polymers from a liquid according to claim 1, wherein the degassing chamber is in the form of a pipe whose cross-section remains constant.

7. A device for precipitating polymers from a liquid according to claim 1, wherein the degassing chamber is in the form of a pipe wherein the cross-section of said pipe remains constant.

8. A device for precipitating polymers from a liquid according to claim 1, wherein the degassing chamber is in the form of a pipe wherein the cross-section of the end of said pipe is 25 times the cross-section of the beginning of said pipe.

9. A device for precipitating polymers from a liquid according to claim 1, wherein the length of the degassing chamber is from about 30 to about 60 times the cross-section of the beginning of said pipe.

10. A device for precipitating polymers from a liquid according to claim 1, wherein each said nozzle is associated with each said outlet orifice.

11. A device for precipitating polymers from a liquid according to claim 1, wherein discharge ports of said nozzles have a width at least that of the outlet orifices.

12. A device for precipitating polymers from a liquid according to claim 1, wherein discharge ports of said nozzles have a slot shaped cross-section.

13. A device for precipitating polymers from a liquid according to claim 1, wherein said outlet orifices for the polymer-containing fluid consist of bores in the nozzle plate.

14. A device for precipitating polymers from a liquid according to claim 1, wherein a plane formed by an outer edge of said outlet orifices for the polymer-containing fluid lies in or below a center plane formed by said axes of the nozzles.

15. A device for precipitating polymers from a liquid according to claim 1, further comprising a cylindrical insert for each said outlet orifice, said insert protruding into the outlet orifice for the polymer-containing fluid and forming an annular gap of constant width within the outlet orifice, said insert having an end which lies in or approximately in the plane formed by an outer edge of the outlet orifice.

16. A device for precipitating polymers from a liquid according to claim 15, further comprising a frusto-conical insert for each said outlet orifice, said frusto-conical insert displaceable in its axial direction and forming an annular gap of variable width within the outlet orifice.

17. A device for precipitating polymers from a liquid according to claim 16, further comprising an insert comprised of a frusto-conical part and a cylindrical part having a diameter equal to the diameter of the outlet orifice, said cylindrical part adjoining the frusto-conical part at the base of the frusto-conical part.

18. A device for precipitating polymers from a liquid according to claim 17, where the base of said frusto-conical part has a diameter smaller than that of the cylindrical part.

19. A device for precipitating polymers from a liquid according to claim 1, further comprising an insert, said insert being displaceable in its axial direction and having a cylindrical part adapted to penetrate the outlet orifice.

* * * * *

UNITED STATES PATENT AND TRADEMARK OFFICE
CERTIFICATE OF CORRECTION

PATENT NO. : 5,181,987
DATED : Jan. 26, 1993
INVENTOR(S) : Breuker et al.

It is certified that error appears in the above-identified patent and that said Letters Patent is hereby corrected as shown below:

In the drawings, Sheet 1, Fig. 1, the reference numeral 33 should be applied to the stirrer element within the vessel 1.
    In the drawings, Sheet 1, Fig. 1, the reference numeral 34 should be applied to the pump element along the feed line 3 between the vessel 1 and the precipitation device 2.
    In the drawings, Sheet 1, Fig. 1, the reference numeral 35 should be applied to the flow instrument FC.
    In the drawings, Sheet 1, Fig. 1, the reference numeral 36 should be applied to the temperature instrument T1.
    In the drawings, Sheet 1, Fig. 1, the reference numeral 37 should be applied to the temperature instrument T2.
    In the drawings, Sheet 1, Fig. 1, the reference numeral 38 should be applied to the level instrument LC.
    In the drawings, Sheet 1, Fig. 1, the refreence numeral 39 should be applied to the transport line between the degassing chamber 7 and the vessel 1.

Signed and Sealed this

Eighth Day of February, 1994

*Attest:*

BRUCE LEHMAN

*Attesting Officer*     *Commissioner of Patents and Trademarks*